July 11, 1950 — W. R. CUSTER — 2,514,478
CHANNEL WING AIRPLANE
Filed Aug. 14, 1947

INVENTOR.
W. R. CUSTER
BY Harvey & O'Connell
ATTORNEYS

Patented July 11, 1950

2,514,478

UNITED STATES PATENT OFFICE 2,514,478

CHANNEL WING AIRPLANE

Willard R. Custer, Hagerstown, Md.

Application August 14, 1947, Serial No. 768,579

3 Claims. (Cl. 244—12)

This invention relates to a channel wing airplane and represents improvements over that shown and described in my copending application Serial Number 617,616, filed Sept. 20, 1945, and which matured as Pat. No. 2,476,482.

As a result of publication given tests of the Custer channel wing by private and government laboratories, the phenomenal static lift of the channel-type wing is now coming to be recognized in the art. Since I have described the advantages and characteristics of the channel wing in a number of previously-filed applications, it is not necessary to reiterate them here. As a result of many calculations and tests, I have invented certain improved ways of utilizing channels in aircraft as taught by this application.

The principal object of this invention is to provide a channel wing airplane having characteristics of great static lift, as well as increased lift in flight.

It is another object to provide a channel wing airplane which resists stalling, even at remarkably low speeds.

It is a further object to provide an airplane that may be easily controlled at low landing and take-off speeds.

These and other objects of the invention will be apparent to those skilled in the art from the following specification taken with the appended drawings wherein.

Figure 1:
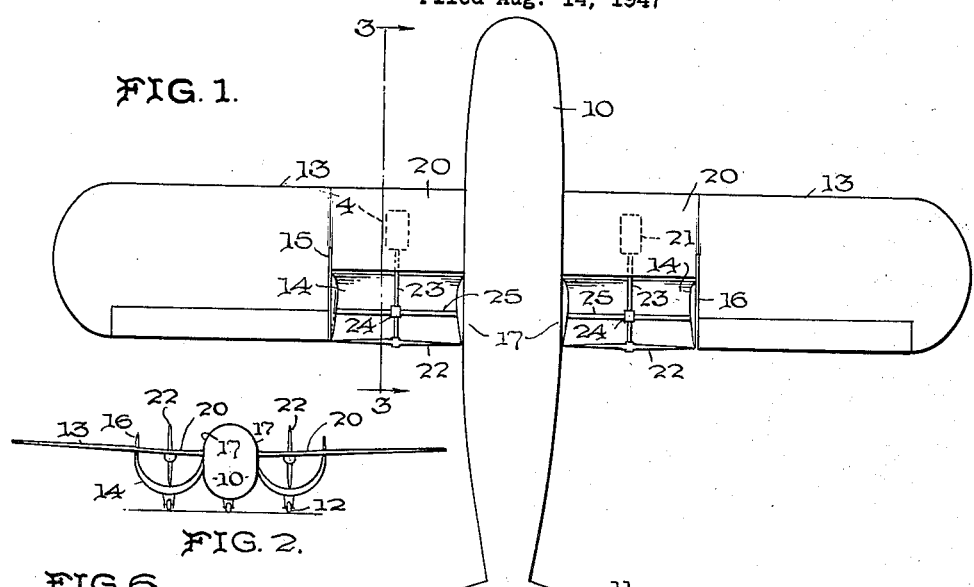
Figure 1 is a top plan view of a two-engine airplane constructed according to the teaching of this invention.
Figure 2:
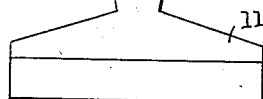
Figure 2 is a front elevation view of the same.
Figure 3:
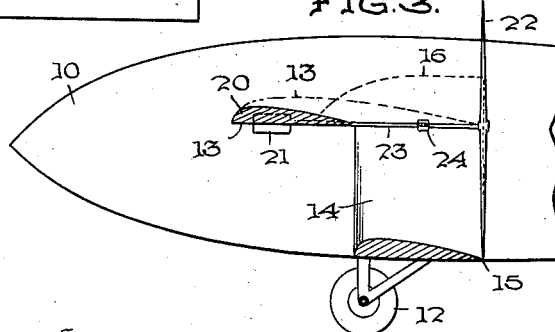
Figure 3 is a transverse sectional view taken through one of the wings on the line 3—3 of Figure 1 looking in the direction of the arrows.

Referring now in greater detail to Figures 1, 2, and 3, wherein I show one embodiment of the invention, the airplane consists of fuselage 10, tail structure 11, landing gear 12, and wings 13. Each wing 13 is of substantially conventional design except that an aft portion of the wing is formed into a channel 14. It will be noted from the drawings that the channel 14 is semi-cylindrical in shape, has its axis in the direction of flight, opens upwardly and at both ends. The chord of the channel is substantially equal to one-half its diameter and roughly equal to one-half the fore-and-aft chord of the entire wing. As illustrated to advantage in Figure 3, the channel in cross section has an airfoil shape to provide lift when the airplane is in flight.

A portion 20 of the wing, immediately forward of the channel, is of airfoil shape in cross section to prevent the front portion of the wing from stalling at very low speeds. This results in greater lift and better control at landing speeds. The wing portion 20 will not interfere with the lifting effect of channel 14 so long as the channel length is no greater than one-half the channel diameter.

An engine 21 mounted in each wing portion 20 drives a propeller 22 through the medium of shaft 23 rotating in journal 24 supported by brace 25. Each propeller 22 rotates in close proximity to the aft edge 15 of channels 14. In the preferred embodiment shown, the length of the propeller 22 is equal to the diameter of the channel 14, the channel extending below the wing and the axis of the propeller being in the plane of the wing. A fin 16 extends upwardly from the junction of the outboard edge of the channel 14 and the wing 13 to aerodynamically isolate the top surface of the wing from the channel. The optimum height for the fin has been found to be about one-sixth of the diameter of the channel. The portion 17 of the fuselage immediately adjacent the channel serves to provide a baffle for the inboard side of the channel, and, like fin 16, prevents the spilling of air into the channel.

Figure 6:
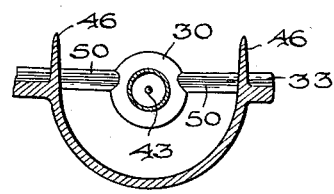
Figure 6 is a detail fragmentary sectional view taken on the line 6—6 of Figure 4, showing to advantage the wing channel, fuselage and propeller, the fuselage and propeller being shown in side elevation.
Figure 5:
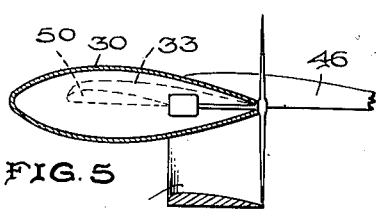
Figure 5 is a fragmentary longitudinal sectional view through the fuselage on the line 5—5 of Figure 4 looking in the direction of the arrows.
Figure 4:
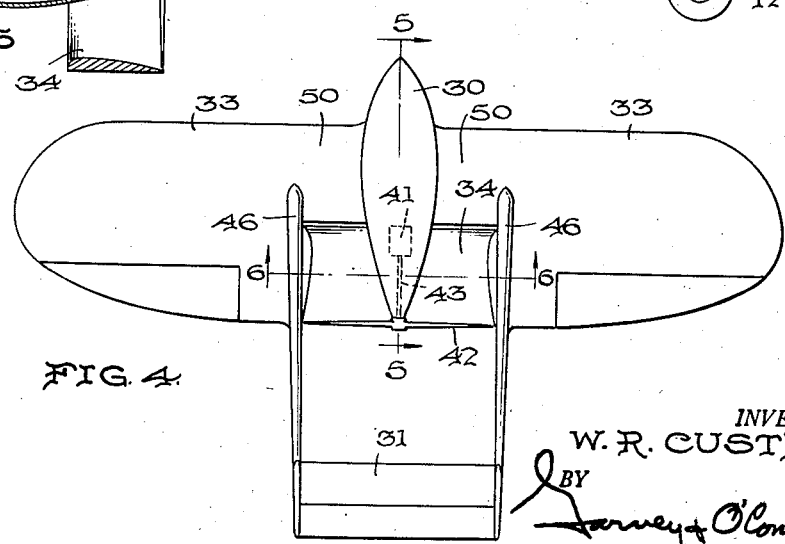
Figure 4 is a top plan view of a modified form of the airplane wherein a single engine is employed.

Referring now to Figures 4, 5 and 6, I show the invention applied to a single-engine airplane having fuselage 30, wings 33, and single channel 34. A motor 41 in fuselage 30 drives propeller 42 by means of shaft 43. Fins 46 extend upwardly from the junction of the edges of channel 34 and the wings 33 a distance preferably equal to one-sixth of the diameter of the channel. The fins 46 are extended rearwardly to provide a support for tail structure 31. The portion 50 of the wing forward of the channel 34 is in the shape of an airfoil to provide lift in flight. In other respects the modification of the invention shown in Figures 4, 5 and 6, is similar to the previously described embodiment shown in Figures 1, 2 and 3.

In the operation of the invention, the propeller, rotating in close proximity to the aft edge of the channel, creates a vacuum in the channel, thereby producing a great static lift. Experimentation has shown that the optimum length of a channel is equal to one-half the diameter of the channel. By constructing the channel wing according to the teaching of this invention, it is feasible to use shorter propellers than would otherwise be necessary and at the same time provide anti-stall characteristics to allow very slow landing speeds. The anti-stall feature combined with the inherently high static lift of the channel contributes toward achieving that most desirable goal of aircraft design: low landing speed and low take-off speed without mitigating cruising speed.

While I have shown and described two forms of my invention, it is to be understood that I am not to be limited thereto and that many changes could be made without departing from the scope of the claims hereto appended.

What I claim is:

1. A wing for airplanes comprising a wing member formed with a recess extending rearwardly from an intermediate part of the wing to the aft edge of the latter, and a channel member secured to and extending downwardly from said wing member and coextensive with said recess, said channel member forming a forwardly, upwardly and rearwardly open channel.

2. A wing for airplanes, as recited in claim 1, in conjunction with baffles carried by the top of the wing member above the sides of the channel.

3. An aircraft comprising a fuselage, a wing member extending laterally therefrom, said wing member being formed with a recess extending rearwardly from an intermediate part of the wing to the aft edge of the latter, a channel member secured to and extending downwardly from said wing member and coextensive with said recess, said channel member forming a forwardly, upwardly and rearwardly open channel, and a propeller mounted on said wing member at the aft edge of said recess, said propeller being so disposed that the propeller disc extends above and below the wing member and the lower portion of the periphery of the propeller disc substantially coincides with the aft edge of the channel member, whereby when the propeller rotates, it will effect the flow of air rearwardly through said channel and above and below said wing member.

WILLARD R. CUSTER.

REFERENCES CITED

The following references are of record in the file of this patent:

UNITED STATES PATENTS

| Number | Name | Date |
|---|---|---|
| D. 115,854 | Loudy | July 25, 1939 |
| 883,565 | Pars | Mar. 31, 1908 |
| 979,341 | Sargeant | Dec. 20, 1910 |
| 1,220,512 | Matta | Oct. 10, 1916 |
| 1,913,809 | Lanier | June 13, 1933 |
| 2,194,596 | Henter | Mar. 26, 1940 |